United States Patent
Dudzinski et al.

(10) Patent No.: US 10,616,824 B2
(45) Date of Patent: Apr. 7, 2020

(54) APPARATUS AND METHOD FOR PROVIDING NETWORK CONFIGURABILITY IN A WIRELESS NETWORK

(71) Applicant: Airspan Networks Inc., Boca Raton, FL (US)

(72) Inventors: Krzysztof Dudzinski, Berkshire (GB); Virendra Nath Nagar, Herndon, VA (US); Alan Carter, Bath (GB)

(73) Assignee: AIRSPAN NETWORKS INC., Boca Raton, FL (US)

( * ) Notice: Subject to any disclaimer, the term of this patent is extended or adjusted under 35 U.S.C. 154(b) by 0 days.

(21) Appl. No.: 15/802,804

(22) Filed: Nov. 3, 2017

(65) Prior Publication Data

US 2019/0141619 A1 May 9, 2019

(51) Int. Cl.
| | |
|---|---|
| *H04W 48/16* | (2009.01) |
| *H04W 76/10* | (2018.01) |
| *H04L 12/24* | (2006.01) |
| *H04W 24/02* | (2009.01) |
| *H04W 84/04* | (2009.01) |
| *H04W 88/04* | (2009.01) |

(Continued)

(52) U.S. Cl.
CPC ......... *H04W 48/16* (2013.01); *H04L 41/0803* (2013.01); *H04W 76/10* (2018.02); *H04W 24/02* (2013.01); *H04W 36/00835* (2018.08); *H04W 36/30* (2013.01); *H04W 84/047* (2013.01); *H04W 88/04* (2013.01)

(58) Field of Classification Search
CPC .............. H04W 84/047; H04W 88/04; H04W 36/0083; H04W 36/0016; H04W 76/10; H04W 48/16; H04W 36/08
See application file for complete search history.

(56) References Cited

U.S. PATENT DOCUMENTS

| | | | |
|---|---|---|---|
| 6,075,988 A | 6/2000 | Anderson et al. | |
| 9,325,398 B2 | 4/2016 | Negus et al. | |

(Continued)

FOREIGN PATENT DOCUMENTS

| | | | |
|---|---|---|---|
| CN | 102056242 A | 5/2011 | |
| CN | 104469891 A | 3/2015 | |

(Continued)

OTHER PUBLICATIONS

PCT Search Report and Written Opinion from PCT/GB2018/052738 dated Dec. 3, 2018, 14 pages.

(Continued)

*Primary Examiner* — Dung Hong
(74) *Attorney, Agent, or Firm* — Haynes Beffel & Wolfeld LLP

(57) ABSTRACT

A node is provided to operate in a wireless network. The node comprises scanning circuitry to perform a scanning process to detect one or more upstream nodes of said wireless network; connection circuitry to form a connection to one of said one or more upstream nodes in response to said scanning circuitry completing said scanning process, wherein said connection is broken as a consequence of said scanning process; storage circuitry to store one or more triggers; and processing circuitry to cause said scanning circuitry to perform said scanning process in response to one of said one or more triggers.

14 Claims, 17 Drawing Sheets

(51) Int. Cl.
*H04W 36/30* (2009.01)
*H04W 36/00* (2009.01)

(56) References Cited

U.S. PATENT DOCUMENTS

| | | | |
|---|---|---|---|
| 10,051,497 B1* | 8/2018 | Parihar | H01Q 1/1257 |
| 10,070,325 B2 | 9/2018 | Logothetis | |
| 2001/0020915 A1 | 9/2001 | Proctor | |
| 2003/0195017 A1* | 10/2003 | Chen | H01Q 1/246 |
| | | | 455/562.1 |
| 2003/0228857 A1 | 12/2003 | Maeki | |
| 2005/0245275 A1 | 11/2005 | Byford et al. | |
| 2005/0277443 A1 | 12/2005 | Ozluturk | |
| 2007/0218910 A1 | 9/2007 | Hill et al. | |
| 2009/0239533 A1* | 9/2009 | Somasundaram | H04J 11/0093 |
| | | | 455/434 |
| 2009/0264123 A1 | 10/2009 | Agashe et al. | |
| 2011/0081903 A1 | 4/2011 | Cai et al. | |
| 2011/0143673 A1* | 6/2011 | Landesman | H01Q 1/1257 |
| | | | 455/63.1 |
| 2012/0028627 A1 | 2/2012 | Hunzinger | |
| 2012/0218964 A1* | 8/2012 | Park | H04B 7/155 |
| | | | 370/329 |
| 2012/0264368 A1 | 10/2012 | Aminaka et al. | |
| 2013/0183971 A1* | 7/2013 | Tamaki | H04W 36/0061 |
| | | | 455/436 |
| 2013/0208653 A1* | 8/2013 | Morioka | H04B 7/155 |
| | | | 370/315 |
| 2013/0260760 A1* | 10/2013 | Pan | H04W 36/0009 |
| | | | 455/436 |
| 2014/0192704 A1 | 7/2014 | Yi et al. | |
| 2014/0301371 A1* | 10/2014 | Maeda | H04W 76/10 |
| | | | 370/331 |
| 2014/0313914 A1 | 10/2014 | Ling | |
| 2015/0024757 A1* | 1/2015 | Bulakci | H04W 36/0088 |
| | | | 455/437 |
| 2015/0043422 A1* | 2/2015 | Fujishiro | H04W 16/26 |
| | | | 370/315 |
| 2015/0063199 A1* | 3/2015 | Wang | H04W 8/06 |
| | | | 370/315 |
| 2015/0065136 A1* | 3/2015 | Lee | H04W 24/02 |
| | | | 455/436 |
| 2015/0131618 A1* | 5/2015 | Chen | H04W 16/02 |
| | | | 370/332 |
| 2015/0195757 A1* | 7/2015 | Tietz | H04W 36/0061 |
| | | | 455/438 |
| 2015/0319677 A1 | 11/2015 | Colban et al. | |
| 2015/0373611 A1* | 12/2015 | Liu | H04W 36/30 |
| | | | 455/436 |
| 2016/0380353 A1 | 12/2016 | Lysejko et al. | |
| 2016/0380354 A1 | 12/2016 | Bozier et al. | |
| 2016/0380355 A1 | 12/2016 | Lysejko et al. | |
| 2016/0381570 A1 | 12/2016 | Lysejko et al. | |
| 2016/0381574 A1 | 12/2016 | Dudzinski et al. | |
| 2016/0381590 A1 | 12/2016 | Lysejko et al. | |
| 2017/0208574 A1 | 7/2017 | Ramakrishna et al. | |
| 2017/0215117 A1* | 7/2017 | Kwon | H04B 7/04 |
| 2018/0020486 A1* | 1/2018 | Yano | H04W 72/0486 |
| 2018/0041605 A1* | 2/2018 | Zhang | H04W 4/70 |
| 2018/0070250 A1* | 3/2018 | Venkataraman | H04W 24/04 |
| 2018/0076877 A1 | 3/2018 | Liu et al. | |
| 2018/0352473 A1 | 12/2018 | Gunasekara et al. | |
| 2018/0359788 A1 | 12/2018 | Abedini et al. | |
| 2019/0028343 A1 | 1/2019 | Putman et al. | |

FOREIGN PATENT DOCUMENTS

| | | |
|---|---|---|
| EP | 2034786 A1 | 3/2009 |
| EP | 2698034 A1 | 2/2014 |
| WO | 2005125021 A2 | 12/2005 |
| WO | 2005125021 A3 | 8/2006 |
| WO | 2008007375 A2 | 1/2008 |
| WO | 2008007375 A3 | 7/2009 |
| WO | 2012140999 A1 | 10/2012 |
| WO | 2014106539 A1 | 7/2014 |
| WO | 2014126161 A1 | 8/2014 |

OTHER PUBLICATIONS

PCT Search Report and Written Opinion from PCT/GB2018/052740 dated Nov. 28, 2018, 18 pages.
U.S. Final Office Action in U.S. Appl. No. 15/782,051 dated Jul. 29, 2019, 11 pages.
U.S. Office Action in U.S. Appl. No. 15/782,035 dated Sep. 3, 2019, 22 pages.
UK Combined Search and Exam Report from GB1815785.9, dated Mar. 22, 2019, 7 pages.
UK Combined Search and Exam Report from GB1815790.9 dated Mar. 22, 2019, 8 pages.
UK Combined Search and Exam Report from GB1815793.3 dated Mar. 12, 2019, 8 pages.
U.S. Office Action in U.S. Appl. No. 15/782,035 dated Feb. 25, 2019, 16 pages.
U.S. Office Action in U.S. Appl. No. 15/782,051 dated Mar. 8, 2019, 11 pages.

* cited by examiner

Scan List

| Band | PCI | Cell Identity | PLMN Identity | EARFCN | Rank Indicator | SINR | Logical Angle | Heading Angle | Spectral Efficiency |
|---|---|---|---|---|---|---|---|---|---|
| B41H | 78 | 11922178 | 318781440 | 40978 | 2 | 12.85 | 90 | 140 | 4.0 |
| B41H | 78 | 11922178 | 318781440 | 40978 | 2 | 6.42 | 120 | 174 | 1.7 |
| B41H | 78 | 11922178 | 318781440 | 40978 | 1 | 4.2 | 210 | 274 | 1.3 |
| B41H | 78 | 11922178 | 318781440 | 40978 | 1 | 3.42 | 180 | 242 | 1.1 |
| B41H | 78 | 11922178 | 318781440 | 40978 | 2 | 3.22 | 60 | 117 | 0.8 |
| B41H | 78 | 11922178 | 318781440 | 40978 | 1 | 1.8 | 150 | 213 | 0.8 |
| B41H | 78 | 11922178 | 318781440 | 40978 | 1 | 0.77 | 240 | 292 | 0.6 |
| B41H | 78 | 11922178 | 318781440 | 40978 | 1 | -1.33 | 330 | 39 | 0.5 |
| B41H | 78 | 11922178 | 318781440 | 40978 | 1 | -1.8 | 0 | 64 | 0.5 |
| B41H | 78 | 11922178 | 318781440 | 40978 | 1 | -2.32 | 30 | 97 | 0.4 |
| B41H | 78 | 11922178 | 318781440 | 40978 | 1 | -3.61 | 300 | 2 | 0.3 |
| B41H | 196 | 133811201 | 318781440 | 40978 | 1 | -4.24 | 270 | 318 | 0.2 |

FIG. 3

| CDCL PDCL Rank | Scan List Rank | Band | PCI | MCC | MNC | Cell Identity | ECGI | EARFCN | Rank Indicator | SINR | Logical Angle | Heading Angle | Spectral Efficiency |
|---|---|---|---|---|---|---|---|---|---|---|---|---|---|
| -1 | 1 | B41H | 78 | 310 | 083 | 11922178 | 33426657915161 8 | 40978 | 2 | 12.85 | 90 | 140 | 4.0 |
| -1 | 2 | B41H | 78 | 310 | 083 | 11922178 | 33426657915161 8 | 40978 | 2 | 6.42 | 120 | 174 | 1.7 |
| -1 | 3 | B41H | 78 | 310 | 083 | 11922178 | 33426657915161 8 | 40978 | 1 | 4.2 | 210 | 274 | 1.3 |
| -1 | 4 | B41H | 78 | 310 | 083 | 11922178 | 33426657915161 8 | 40978 | 1 | 3.42 | 180 | 242 | 1.1 |
| -1 | 5 | B41H | 78 | 310 | 083 | 11922178 | 33426657915161 8 | 40978 | 2 | 3.22 | 60 | 117 | 0.8 |
| -1 | 6 | B41H | 78 | 310 | 083 | 11922178 | 33426657915161 8 | 40978 | 1 | 1.8 | 150 | 213 | 0.8 |
| -1 | 7 | B41H | 78 | 310 | 083 | 11922178 | 33426657915161 8 | 40978 | 1 | 0.77 | 240 | 292 | 0.6 |
| -1 | 8 | B41H | 78 | 310 | 083 | 11922178 | 33426657915161 8 | 40978 | 1 | -1.33 | 330 | 39 | 0.5 |
| -1 | 9 | B41H | 78 | 310 | 083 | 11922178 | 33426657915161 8 | 40978 | 1 | -1.8 | 0 | 64 | 0.5 |
| -1 | 10 | B41H | 78 | 310 | 083 | 11922178 | 33426657915161 8 | 40978 | 1 | -2.32 | 30 | 97 | 0.4 |
| -1 | 11 | B41H | 78 | 310 | 083 | 11922178 | 33426657915161 8 | 40978 | 1 | -3.61 | 300 | 2 | 0.3 |
| -1 | 12 | B41H | 196 | 310 | 083 | 133811201 | 33426670104064 1 | 40978 | 1 | -4.24 | 270 | 318 | 0.2 |

FIG. 4

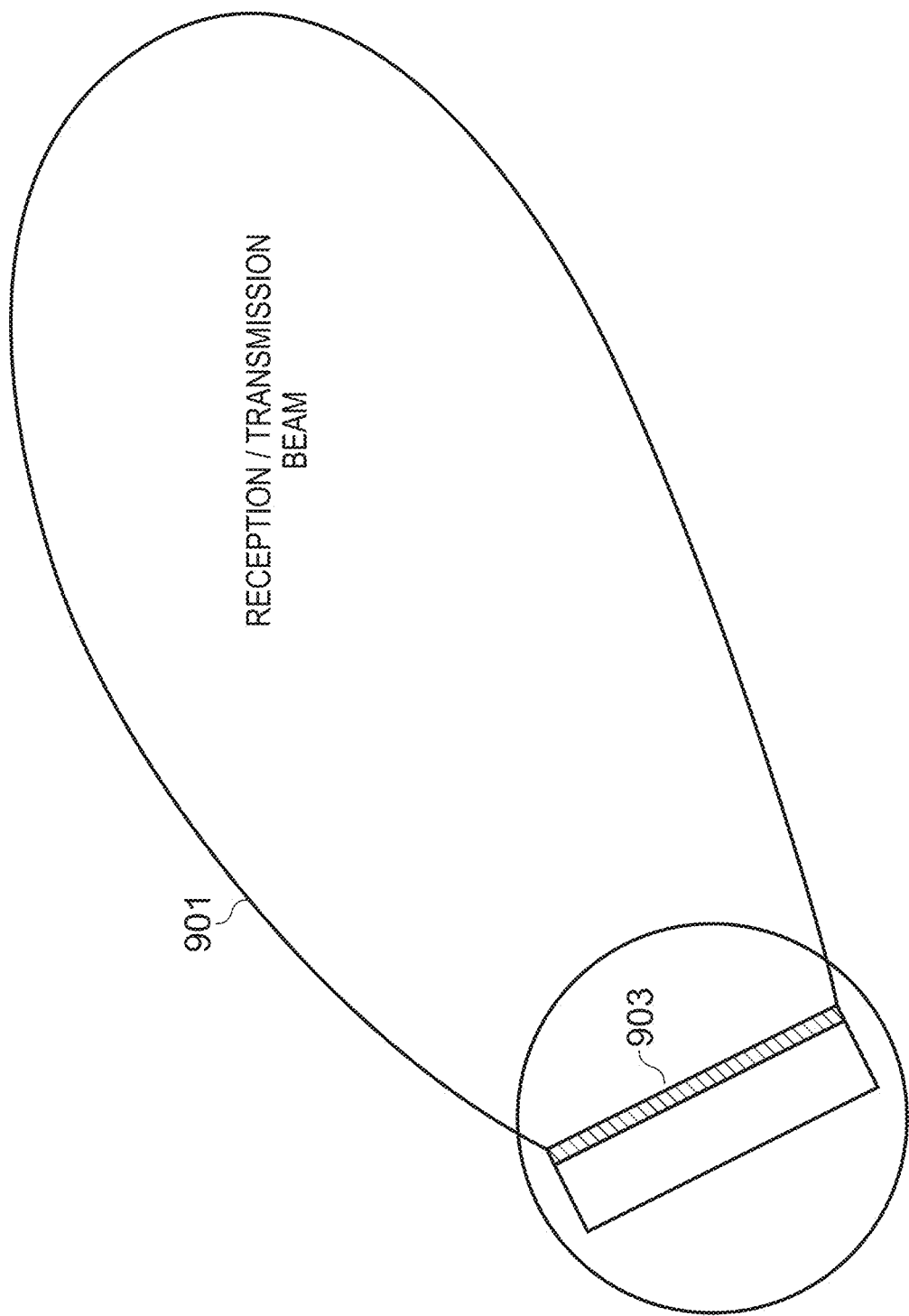

| Rank | Preferred | SINR | RSRP | RSSI |
|---|---|---|---|---|
| 1 | 1 | 12.8 | 1.41 | 24 |
| 2 | 0 | 6.4 | 1.26 | 69 |
| 3 | 0 | 4.2 | 0.81 | 28 |
| 4 | 0 | 3.4 | 1.24 | 20 |
| 5 | 0 | 3.2 | 1.36 | 12 |
| 6 | 0 | 1.8 | 1.11 | 35 |
| 7 | 0 | 0.7 | 0.41 | 31 |
| 8 | 0 | -1.3 | 0.27 | 61 |
| 9 | 0 | -1.8 | 0.69 | 60 |

FIG. 16

| Triggers |
|---|
| 30 seconds elapses |
| Connection breaks |
| Cannot connect to preferred node |
| Cannot connect to highest ranked upstream node |

FIG. 15

APPARATUS AND METHOD FOR PROVIDING NETWORK CONFIGURABILITY IN A WIRELESS NETWORK

RELATED APPLICATION

The present application is related to commonly owned U.S. patent application Ser. No. 15/782,035, which is incorporated by reference as if fully set forth herein.

TECHNICAL FIELD

The present technique relates to an apparatus and method for providing network configurability in a wireless network.

DESCRIPTION

As more and more users embrace mobile technology, ever increasing demands are placed on mobile networks used to support mobile communication. These networks are required to not only support an ever increasing number of devices, but also as the functionality associated with such devices becomes ever more complex, so this has also increased the capacity requirements within the network.

Accordingly, there is a need for network operators to provide improved access to wireless networks in order to enable them to optimise use of bandwidth and improve network coverage. In particular, there is a need to improve the selection of a donor node to act as a backhaul node to provide a backhaul connection for a wireless network.

The problems of providing sufficient network coverage and capacity can be particularly problematic in urban environments, where there is typically not only a high density of users, but where the urban infrastructure, such as large buildings, can significantly attenuate signals, and hence exacerbate the problem of seeking to provide sufficient network coverage and network capacity to service the users. In some situations, handover from a donor node may be disabled to prevent node reselection during use. Accordingly, it would be desirable to provide techniques that enabled the reselection of a donor node.

SUMMARY

In one example configuration, there is provided a node configured to operate in a wireless network, comprising: scanning circuitry to perform a scanning process to detect one or more upstream nodes of said wireless network; connection circuitry to form a connection to one of said one or more upstream nodes in response to said scanning circuitry completing said scanning process, wherein said connection is broken as a consequence of said scanning process; storage circuitry to store one or more triggers; and processing circuitry to cause said scanning circuitry to perform said scanning process in response to one of said one or more triggers.

In another example configuration, there is provided a method comprising: performing a scanning process to detect one or more upstream nodes of a wireless network; forming a connection to one of said one or more upstream nodes in response to completion of said scanning process, wherein said connection is broken as a consequence of said scanning process; storing one or more triggers; and causing said scanning circuitry to perform said scanning process in response to one of said one or more triggers.

In a yet further example configuration, there is provided a node configured to operate in a wireless network, comprising: means for performing a scanning process to detect one or more upstream nodes of a wireless network; means for forming a connection to one of said one or more upstream nodes in response to said means for performing said scanning process completing said scanning process, wherein said connection is broken as a consequence of said scanning; means for storing one or more triggers; and means for causing said means for performing a scanning process to perform said scanning process in response to one of said one or more triggers.

BRIEF DESCRIPTION OF THE DRAWINGS

The present technique will be described further, by way of example only, with reference to examples thereof as illustrated in the accompanying drawings, in which:

FIG. 3 illustrates a candidate list as determined by filter circuitry in accordance with some examples;

FIG. 4 illustrates another candidate list as determined by the data processing circuitry in accordance with some examples;

FIG. 9 illustrates a directional antenna having a directional reception and transmission beam;

FIG. 15 illustrates an example of the one or more triggers which cause the scanning circuitry to perform the scanning process;

FIG. 16 illustrates an example of a ranking of a plurality of upstream nodes detected by the scanning circuitry of a node according to some examples of the present technique;

DESCRIPTION OF EXAMPLE EMBODIMENTS

Figure 1:
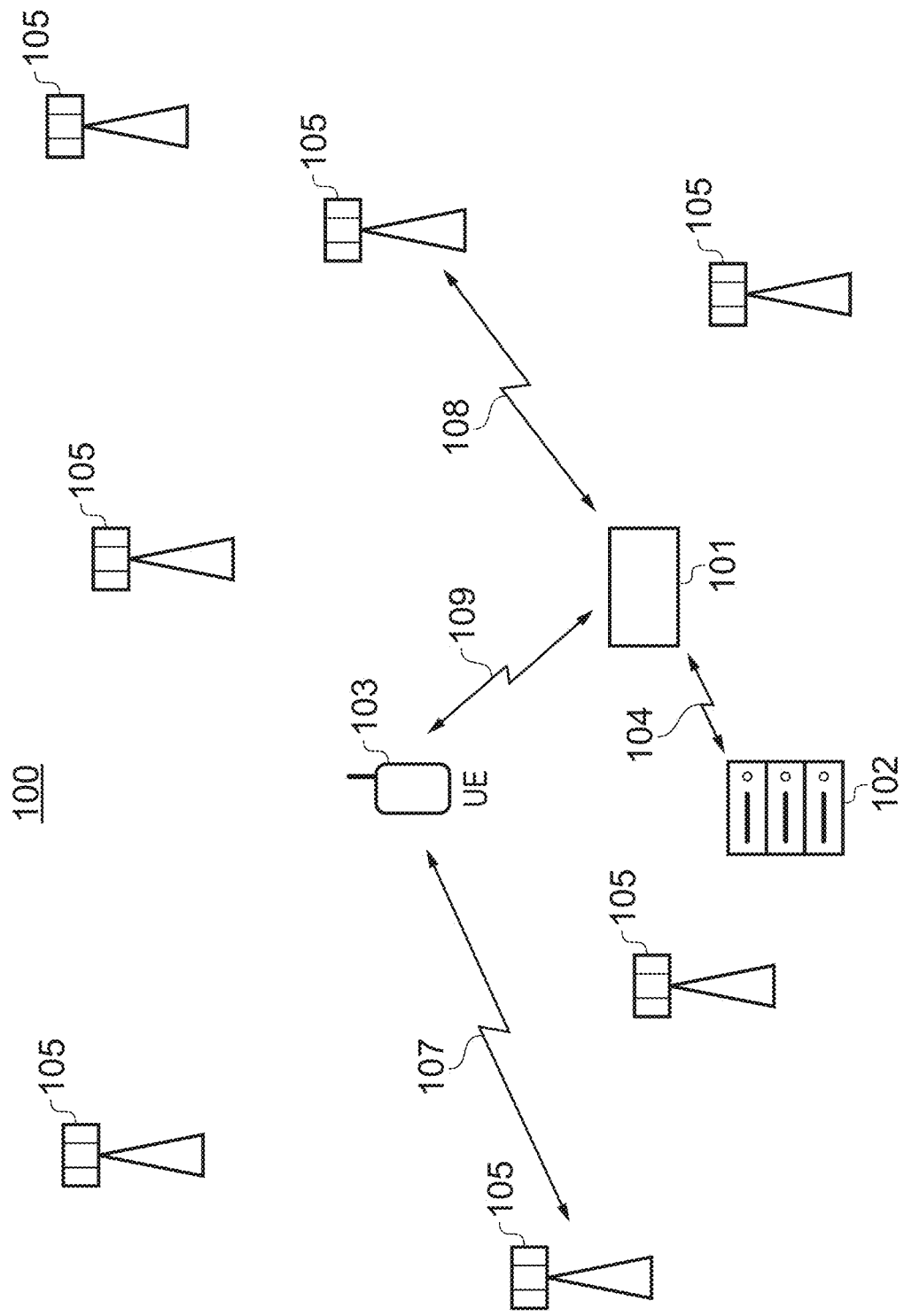
FIG. 1 is a system overview of a wireless network.

Before discussing the embodiments with reference to the accompanying figures, the following description of embodiments is provided.

In a typical wireless network, there may be a plurality of upstream nodes (for example, donor nodes) to which a User Equipment (UE) may connect. In some circumstances, it may be beneficial for a UE to connect to a node (for example, relay node) which would establish a wireless backhaul link with the upstream node and provide the UE with access to the wireless network via the relay node. The wireless backhaul link (connection) thereby provides the UE with a backhaul connection to the wireless network via the relay node.

Once a node has established a connection to a selected upstream node, it may be desirable to disable handover. This would prevent the node from immediately switching to an alternative upstream node in the event that the alternative upstream node becomes more desirable to connect to, for providing connectivity to the wireless network. There are a number of reasons which could make disabling handover desirable. For example, disabling handover may be desirable if the operator of the wireless network wishes to plan the allocation of channel capacity (bandwidth) across a plurality of upstream nodes in order to improve the quality of service (QoS) to the end user. In addition, disabling handover may be desirable in order to reduce the effects of colocation interference. Further, in some environments, a handover may otherwise be triggered randomly as a result of noise or small changes in the relative performance characteristics (RF characteristics) of the link between the node and each of the upstream nodes. Hence, by disabling handover, this issue can be avoided.

According to one aspect, there is provided a node configured to operate in a wireless network, comprising: scanning circuitry to perform a scanning process to detect one or more upstream nodes of said wireless network; connection circuitry to form a connection to one of said one or more upstream nodes in response to said scanning circuitry completing said scanning process, wherein said connection is broken as a consequence of said scanning process; storage circuitry to store one or more triggers; and processing circuitry to cause said scanning circuitry to perform said scanning process in response to one of said one or more triggers.

There may be a number of triggers that cause the node to perform the scanning process to detect one or more upstream nodes in the wireless network. For example, such a scanning process may be necessitated if a previous connection to the upstream node were lost. However, as another example, the scanning process could take place every period of time in order to increase the probability with which a good quality upstream node is selected for connection to the network. According to the present technique, the node comprises storage circuitry to store one or more triggers. Each of the one or more triggers may specify a condition (e.g. a trigger condition) configured to cause a scanning process to be performed. The scanning process is performed by scanning circuitry to detect one or more wireless backhaul nodes and a performance characteristic associated with each of the one or more wireless backhaul nodes. By providing a trigger to cause the scanning process to be performed, it is possible to perform the scanning process when a connection with an upstream node is broken. This means that control of when the node forms a connection with an alternative upstream node can be increased. In view of the fact that the scanning process causes an existing connection to be broken, causing the scanning process to occur in response to one or more triggers, thereby giving more control over the scanning process, in turn leads to control over when any existing connection is disconnected and can thereby lead to an increase in throughput of the wireless network.

In some examples, said one or more triggers comprise said connection being broken.

As explained above, the connection formed between the node and the selected upstream node may be broken. For example, the connection may be broken if the operator is required to re-plan the allocation of upstream nodes in the wireless network or to perform maintenance on the wireless network (macro network) which may require the selected upstream node to be made temporarily unavailable. In another example, the upstream node may suffer a temporary or indefinite failure which could prevent connected nodes from accessing the wireless network. By storing a trigger in the storage circuitry to cause the scanning process to be performed if the connection is broken, it is possible to select an alternative upstream node to connect to in order to form an alternative connection to the wireless network. The condition of the trigger may, in some examples, be a value or a flag to be interpreted by the processing circuitry and which is operable to cause the processing circuitry to perform a scanning process.

In some examples, said one or more triggers comprise expiration of a timer.

It may be the case that over time, the quality of a connection to an upstream node (as indicated by, for example, a performance characteristic) may vary. A performance characteristic may, for example, be the Received Signal Strength Indicator (RSSI), a Reference Signal Received Power (RSRP), a Signal to Interference and Noise Ratio (SINR) or bandwidth, among others, or combinations thereof. In addition, an alternative upstream node may be included in the wireless network that was not previously available for selection. Therefore, it is desirable to periodically perform the scanning process in order to detect one or more upstream nodes in the wireless network and to form a connection to one of them. By storing a trigger in the storage circuitry to cause the scanning process to be performed when a timer expires, it is possible to select an alternative upstream node to connect to in order to form an alternative connection to the wireless network. This timer may have a configurable expiration. For example, the timer may be configured to expire weekly or monthly or may expire at a predetermined day and time. The time of expiration may be set to minimise disruption to UEs which might be connected to the node, since the scanning process causes the connection to the upstream node to be broken. For example, a weekly timer may be configured to expire at 03:00 am every Sunday when usage might be expected to be low. Alternatively, a monthly time may be configured to expire at 03:00 am on the first day of each month. Alternatively, the time may be configured to expire every n hours. In some examples of the one of more triggers comprising the expiration of a timer, the trigger includes a set of parameter values which specify at least one of a predefined duration, a predefined time of expiration and a predefined date of expiration, among other values. In some examples for which the time of expiration of the timer is configurable, the flexibility of triggering the scanning process can be improved since the user/operator can determine when to perform the scan based on a desirable time for the user/operator. This improves the ability to find a suitable balance between uninterrupted use and improving the selection of upstream node based on link quality.

In some examples, said node comprises ranking circuitry to rank said one or more upstream nodes based on a set of criteria; said connection circuitry is configured to form a connection to a highest ranked upstream node; and said one or more triggers comprises failing to connect to said highest ranked upstream node.

For each upstream node detected during the scanning operation, a set of criteria is detected, e.g. the value of a performance characteristic is measured. Therefore, the node can store a list of all detected upstream nodes which each have a corresponding set of criteria. This enables ranking circuitry to rank the one or more upstream nodes based on the set of criteria. Connection circuitry may then connect to a higher (better) ranked node. Hence, the performance of the wireless network can be improved by enabling an improved choice of which node to connect to.

In some examples, the set of criteria includes radio frequency properties.

Radio frequency (RF) properties of a connection between a node and an upstream node are important when determining the quality of the connection and therefore the QoS that may be achieved when using that connection. Therefore, by ranking the one or more upstream nodes based on their radio frequency (RF) properties, it is possible to specify an order of preferential connection in order to maximise the quality of the connection. RF properties may include, for example, Signal to Interference and Noise Ratio (SINR), channel Rank Index (RI), and Received Signal Reference Power (RSRP), among others. The node may also be configured to allow the user or the operator of the wireless network to determine the specific RF property or combination thereof that should be used by the node to rank the upstream nodes. As a result, it is possible to determine an upstream node for the node to connect to on the basis of the most appropriate RF property. This ranking processing is therefore highly configurable.

In some examples, said set of criteria includes a preferred upstream node; and said one or more triggers comprises failing to connect to said preferred upstream node.

A management server determines at least one criterion, which may be sent to the node. The at least one criterion may be set by the management server to indicate how the ranking circuitry should rank each upstream node detected by the scanning circuitry. The at least one criterion may specify one or more given nodes (upstream from the node) to be used as preferred upstream node(s). The node may, in some examples, connect to the management server to request the at least one criterion. When a preferred upstream node is specified in a criterion from a management server, the ranking circuitry may rank the preferred upstream node most highly. By enabling a management server to provide the node with a criterion specifying the upstream node to use, it is possible to increase the control provided to the operator since they are able to specify that particular upstream nodes should be used.

In some examples, said scanning circuitry is restricted to performing said scanning process within one or more allowed times.

In some circumstances, said scanning process occurs as a consequence of a trigger, but after being delayed for a period of time so that it is performed within one or more allowed times. In this way, the scanning process still occurs as a consequence of a given event happening, but the ensuing disconnection of a current connection is delayed until an appropriate point in time.

For instance, in some examples, said one or more allowed times include a time when usage of said node is at or below 25% of its average maximum usage for a given day.

The average maximum usage is determined, for example, by calculating a mean level of data throughput used at a peak time each day (however it will be appreciated that the skilled person would recognise that the average could be a median or a mode, or other types of average). In particular, the maximum level of data throughput each day may be recorded and the average maximum usage may be determined by performing a calculation of the mean value of each recorded maximum level of data throughput. In some examples, the average may be determined over a predefined period, such as the last week, the last month or a predefined number of days in the past. In some examples, the maximum level of data throughput can be substantially the maximum level of data throughput achieved by rounding the maximum level of data transfer. The pattern of use of the connection may vary with each user. Hence, the one or more allowed times can be adjusted, based on the changing use patterns of the upstream node. Accordingly, by determining a time when the usage of the node is at or below a percentage of an average maximum value, such as 25% the average maximum usage, it is possible to reduce the inconvenience caused to the user and also to increase the capacity of the wireless network.

In some examples, said one or more allowed times include a time when usage of said node is at a lowest point.

This enables the selection of a time to perform the scanning process so as to reduce or even minimise the inconvenience caused to the user. For example, there may be an allowed timing window of 01:00 am-03:00 am each day. The one or more allowed times may be, for example, a predetermined time or a window of time. The usage of the node may be estimated, for example, the usage could be estimated based on historical data using parameters such as the day of the week.

In some examples, said node is stationary.

The node may, for example, be fixed to a street sign, a lamp post, or located near a window on a ledge or a wall. The present technique is able to perform the scanning process in response to a trigger without the node being required to be moved. By reducing the need for the node to move, the amount of wear-and-tear on the device can also be reduced. Hence, by the node being stationary, the maintenance and longevity of the node can be improved.

In some examples, said node comprises an antenna array; and the scanning process causes the antenna array to sweep an area over a period of time.

The scanning process can be performed for each antenna rotation and a reference to the antenna rotation can be stored in the storage circuitry of the node as the antenna position during the scanning process. By sweeping an area over a period of time it is possible to determine any available upstream nodes in each direction, rather than only those which can be detected from a fixed antenna direction.

In some examples, said antenna array sweeps over said area over a period of time by rotation of said antenna array.

In this example, the rotation of the antenna is performed by a motor to physically rotate the antenna relative to a fixed reference point.

In some examples, said antenna array sweeps over said area over a period of time by altering a shape of a beam of said antenna array.

The rotation of the antenna may be an electronic rotation of the antenna beam, for example through beamforming. The antenna array provides beamforming capability to enable the shape of the transmission and reception beam to be adjusted. Accordingly, it is possible to alter the attenuation of signals received from different directions and thereby reduce the effects of interference. In addition, it is possible to perform the sweep during the scanning process to enable upstream nodes to be detected in each of a plurality of directions. Accordingly, it is possible to perform a sweep without requiring the antenna array to be physically rotated. Note that in some embodiments, both beamforming and physical antenna rotation may be used. For example, beamforming could be used to perform an initial scan, with physical rotation being used as a "follow up" to confirm readings made at particular angles. For example, candidate upstream nodes could be initially identified by beamforming, and then physical antenna rotation can be used to confirm readings made by beamforming of those candidates. In this way, power consumption can be reduced by reducing the amount that the antenna is physically rotated.

In some examples, the apparatus is configured to be moved between a plurality of areas so that, in a sub-scanning process, the antenna can cover different areas. The apparatus could indicate to the user that it needs to be physically moved. This could be via a display, alarm, or by notifying the user in any other manner (e.g. by email). The user can interact with the device to indicate that a move is complete, that there are more moves to be performed, or that a move is no longer possible. Having completed the scanning in each location, the device can then indicate to the user where to be placed. A location could be referred to by number (e.g. location 3) or by a name entered by a user. In some examples, said scanning process causes upstream nodes of said wireless network to be discovered by scanning a plurality of frequency bands.

The present technique recognises that there may be more than one frequency band for which access has been granted by the operator to access upstream nodes. Therefore, the scanning process is performed for each of the available frequency bands. The candidate list may additionally store a reference to the frequency band when the scanning process is performed.

In some examples, said node comprises an antenna array; and said scanning process causes said antenna array to sweep an area over a period of time for each band in said plurality of frequency bands.

The scanning process can be performed for each combination of the available antenna positions and the available frequency bands. This further provides an additional choice to the User Equipment Relay (UER) for its selection of a donor node.

In some examples, said one or more upstream nodes provide a wireless backhaul; and said node acts as a relay node connectable to one or more items of user equipment to which access to said wireless backhaul is provided.

A wireless network may comprise a plurality of upstream nodes (donor nodes) to which a UE (user equipment) may connect to. However, it may be advantageous for a UE to connect to a node, whereby the node forms a connection to an upstream node and provide the UE with access to the wireless network via the node. According to this configuration the node operates as a relay node to relay access to the wireless network to the UE. The connection between the relay node and the upstream node thereby provides the UE with a wireless backhaul connection to the wireless network via the relay node. By installing a node according to the present technique to act as a relay node, through a connection to an upstream node, the coverage offered to UEs can be greatly increased since a UE can form a connection to a backhaul network by connecting to either an upstream node or a nearby user equipment relay (UER) node (which is itself connected to a wireless backhaul node), rather than being limited only to upstream nodes.

Particular embodiments will now be described with reference to the Figures.

FIG. 1 schematically illustrates a wireless network 100 in which there is arranged a plurality of DeNBs 105, a user equipment device (UE) 103 and a node 101 as used in the above described examples. Herein, the User Equipment Relay (UER) 101 is an example of the claimed node and the DeNB 105 is an example of the claimed wireless backhaul node. In the wireless network 100 illustrated, the UE 103 is operable to connect to a DeNB 105 directly, or to connect to the UER 101 according to the present technique, to receive access to a backhaul network. For example, in an urban environment there may be a large number of tall buildings which obscure the view of the UE 103 from accessing the DeNB 105. Alternatively, in a rural environment, the DeNB 105 may be located a large distance from the UE 103 and therefore the received signal strength from the DeNB 105 may be insufficient to form a suitable connection. In this case, a UER 101 is operable to perform the functionality of the present technique. In this case, the UER performs successive scanning operations in each of a plurality of antenna positions in order to detect at least one DeNB 105 within range of the UER 101 and stores a reference to each detected DeNB 105 in a candidate list along with the antenna position and performance characteristic which correspond to the detected DeNB 105.

According to some examples, an Element Management Server (EMS) 102 may be used to store a centralised list of scan measurements of the scanning operation which may be reported by the node 101 to the EMS after the successive scanning operations are complete. The configuration may also thereby be supplied by the EMS. According to this example, the UER 101 is operable to receive a prioritised candidate list (donor selection list), which may also be referred to as a prioritised donor cell list (PDCL), which is prioritised based on air interface capacity, available backhaul capacity, available delay capacity and network load balancing. The UER will then autonomously re-select the most suitable donor 105 based on the PDCL and provide backhaul services to the connected DeNB 105.

Figure 2:
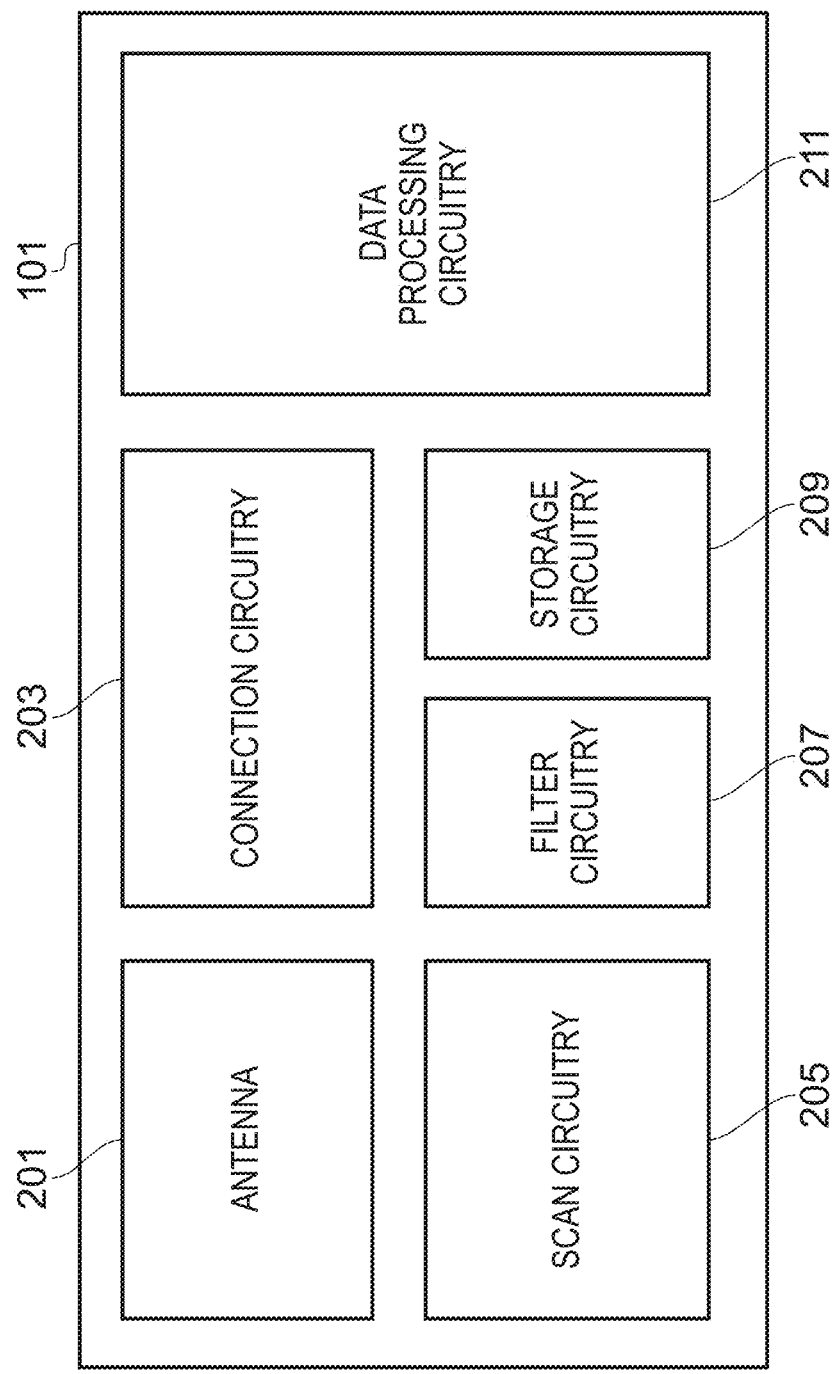
FIG. 2 is a block diagram illustrating the functionality provided within a node 101 of FIG. 1 in accordance with some examples.

FIG. 2 schematically illustrates a node as used in the described examples. Herein, the node (cellular relay node) will also be referred to as a user equipment relay (UER). As shown, the node 100 comprises scan circuitry 205 which is configured within the node 101 to perform a scanning operation to detect one or more DeNBs 105 and a performance characteristic. The scan circuitry uses the antenna 201 to perform the scanning operation and the antenna 201 is configured to be movable into a plurality of positions to enable the scan circuitry 205 to perform the scanning operation in a plurality of antenna positions. Antenna positions will be described later in respect of FIGS. 7, 8 and 9. The scanning operation may be performed for all available operator defined bands and detects a performance characteristic associated with each of the one or more DeNBs. This performance characteristic may, for example, be a signal to interference noise ratio (SINR), spectral efficiency (SE), a reference signal received power (RSRP) or other performance indicator.

Filter circuitry 207 is also provided by the node 100 which is arranged within the node 100 to store references to each of the detected DeNB nodes (candidate donor nodes) in a candidate list stored in the storage circuitry 209. The filter circuitry may also be configured to store in the candidate list, for each visible donor candidate node: the frequency band being used by the UER during the scanning operation, PCI (Physical Cell Identity), PLMN (Public Land Mobile Network), a cell identifier, EARFCN (EUTRA Absolute Radio-Frequency Channel Number), rank indicator, SINR (Signal-to-Interference-plus Noise Ratio), the antenna direction used by the node during the scanning operation, spectral efficiency and TAC (Tracking Area Code). The data processing circuitry 211 of the node 100 then selects the best candidate donor node from the candidate list in order to complete the plug-and-play (PnP) functionality of the UER 101.

The node 101 also comprises connection circuitry 203 which is operable to receive configuration information from the candidate donor node selected by the data processing circuitry 211. This configuration information may specify a candidate donor node to be used as the donor node. Alternatively the configuration information may list a plurality of donor nodes with corresponding priority information to be used to update an order of the candidate nodes in the candidate list. In response to receiving the configuration information, the data processing circuitry may subsequently select, from the candidate list, a preferred wireless backhaul node to be used as the donor node.

FIG. 3 illustrates an example candidate list 303. According to this example, the candidate list may include an indication of the band, PCI, the identity of the cell (reference to the wireless backhaul node), the PLMN identity, EARFCN, a rank indicator, SINR, both a logical angle and a heading angle of the antenna and the SE. As illustrated in FIG. 3, the first entry of the candidate list (scan list) illustrates a single candidate donor node detected by the UER. In the case of the first detected candidate node, it was detected on band B41H with a PCI value of 78. The entry additionally records an SINR value (in this example, this is the performance characteristic) of 12.85 and an SE value of 4.0. The candidate node is recorded to have been detected at a logical angle of 90 (angle relative to a local reference point) and a corresponding heading angle of 140 (angle relative to a remote reference point, such as due North).

In the second entry, it can be seen that the logical angle is altered to 120 and the heading angle to 174. Accordingly, for the same candidate node, indicated by the same cell identity, the SINR and SE values differ from the previous entry. This may, for example, be done by rotating the directional antenna 801 or by using beamforming. Alternatively, it could be done by physically placing the UER in an alternative location.

It will be appreciated that in some situations the band of a detected candidate node will differ. For example the band of a detected candidate node may be B25 or B41L. In some instances a single candidate node may be detected on a plurality of channels. In this example, it is clear that the device is doing a single rotation (e.g. considering all angles) for a single band. In the case that no candidate donor nodes were found, the process would then be repeated for a different band. In other examples, all bands may be searched for a single antenna position (e.g. location) before moving on to the next position.

FIG. 4 illustrates an example of the modified candidate list 307. According to this example, the candidate list may include the PDCL (Preferred DeNB Cell List) rank, the scan list rank, an indication of the band, PCI, MCC (Mobile Country Code), MNC (Mobile Network Code), the identity of the cell (reference to the wireless backhaul node), ECGI (E-UTRAN Cell Global Identifier), the PLMN identity, EARFCN, a rank indicator, SINR, both a logical angle and a heading angle of the antenna and the SE (Spectral Efficiency). As illustrated, a scan list rank is allocated to each entry of the candidate list. This scan list rank may be used, for example, when selecting a preferred DeNB from the candidate list based on the received configuration information. The scan list rank may be generated based on, any of the band, SINR, and SE (among others) and may be used to determine the priority of use of one candidate node over another.

Figure 5:
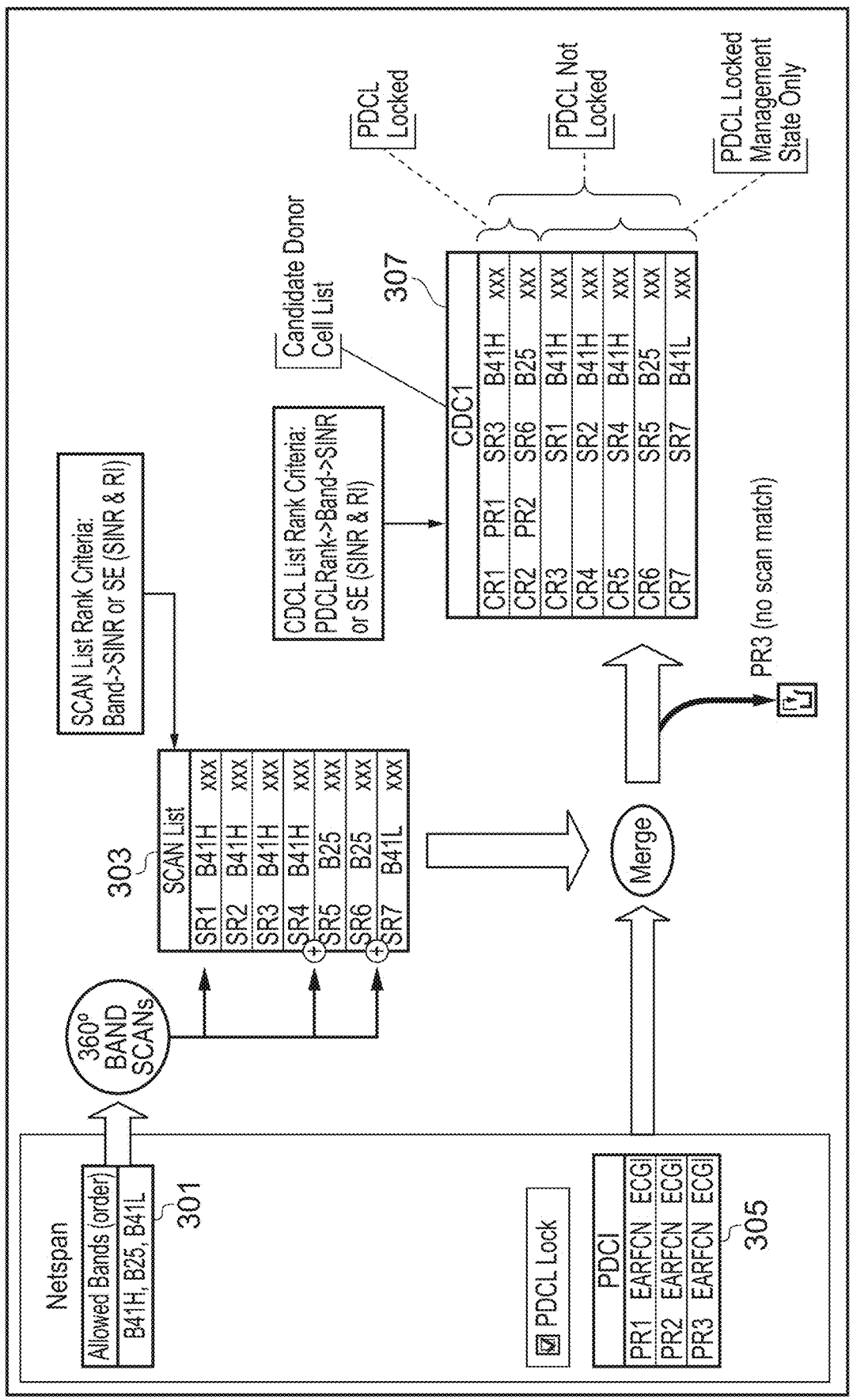
FIG. 5 illustrates the scanning operation and subsequent ordering of a candidate list in accordance with some examples.

FIG. 5 illustrates an example of the present technique by showing the candidate list (scan list) 303 being used by the data processing circuitry to subsequently select a DeNB from a modified candidate list (CDCL) 307 after the connection circuitry 203 has received configuration information (PDCL) 305 from the selected DeNB. As described above with reference to FIG. 2, the scan circuitry 205 performs successive scanning operations for each of a plurality of antenna positions. In one example, the scanning operation is performed for each of a plurality of allowed frequency bands 301 in each of the plurality of antenna positions, resulting in the candidate list 303.

As shown in FIG. 5, the candidate list 303 includes a reference to the candidate donor node, the frequency band used at the time of detection and a performance characteristic (scan list rank criteria). For example, the first four entries in the candidate list (scan list) 303 correspond to candidate donor nodes in the B41H frequency band, the following two candidate donor nodes are detected on the B25 frequency band and the final candidate donor node is detected on the B41L donor node. Again, in some examples, the device scans each frequency band for a given antenna position before moving to a next antenna position. In some examples, only the top priority band is scanned for a given antenna position, and if no candidate node is found in that band then only the next highest priority band it scanned. The candidate donor nodes in the candidate list 303 are detected at a plurality of antenna directions and each have an associated performance characteristic (SINR, SE etc). The rank priority of the candidate nodes in the candidate list 303 is designated by the identifier in the first column of the candidate list 303. For example, SR1 indicates a scan rank of 1, SR2 indicates a scan rank of 2, and so on. In this example, the scan rank indicates a candidate donor node which is preferred for selection based on its performance characteristic. In some examples, the device scans each antenna position for a given frequency band before moving to a next frequency band.

In some examples, upon reception of the configuration information 305 from the selected DeNB or from the EMS, the candidate list 303 is merged with the configuration information to produce a modified candidate list. The modified candidate list may also be referred to as the candidate donor cell list (CDCL) and may comprise an updated order based on the configuration information. In addition, the PDCL list may be indicated as being "locked". In particular, when received from the EMS, an accompanying flag "PDCL Locked" may also be received. When this flag is set (indicating a locked PDCL), the receiving node can provide wireless backhaul and be managed by the EMS only when connected to candidate donor nodes listed in the PDCL list. If a connection to a candidate donor node on the PDCL list is not possible, the node can connect to a donor not listed on the PDCL list, but may only connect for management purposes and not to provide wireless backhaul. This is indicated in FIG. 5 for the candidates shown as having "PDCL locked management state only". If the PDCL flag is not set (not locked), the node can deliver a full service (management and wireless backhaul) when connected to any candidate donor from the CDCL list. This is indicated in FIG. 5 for the candidates shown as having "PDCL not locked". In this case, the PDCL list is used only for ranking of the candidate donor nodes in the CDCL.

In some examples, the EMS may supply a list of allowed frequency bands and frequency sub-bands to the node 101 and may also apply a prioritisation to each band by specifying band prioritisation information corresponding to each of the plurality of frequency bands and frequency sub-bands. The band prioritisation information may thereby be used to apply a band priority to specify which of the frequency bands or sub-bands are to be preferentially used during the scanning operation.

Figure 6:
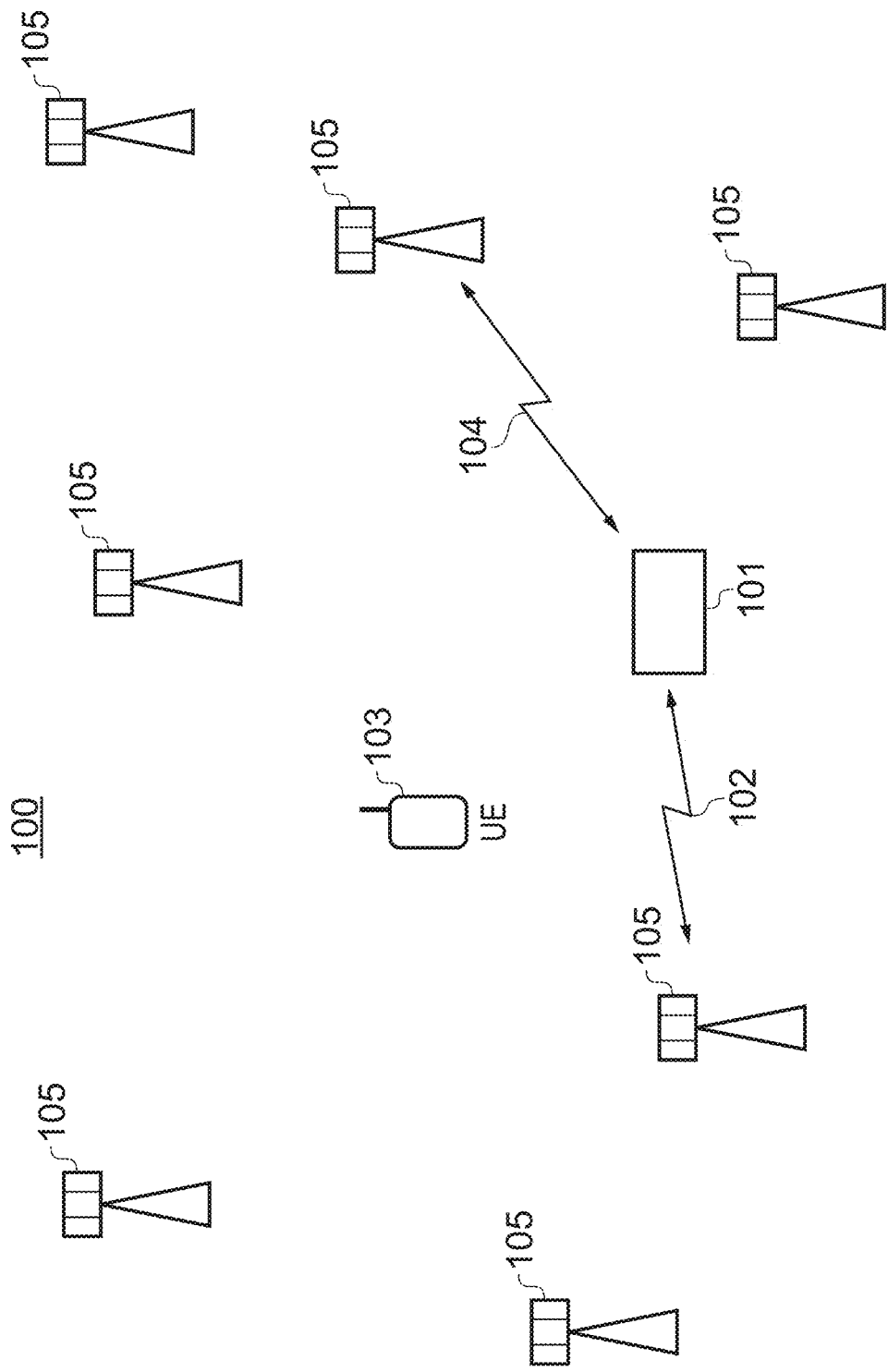
FIG. 6 is a system overview of the wireless network which illustrates a change in the selection of the wireless backhaul node to be the donor node for a node in accordance with some examples.

FIG. 6 illustrates a wireless network 100 as described in FIG. 1 wherein the UER 101 establishes a connection with a selected DeNB 105 via a first communication link 102, the selected DeNB 105 being selected based on a corresponding performance characteristic detected during the scanning operation and stored in the storage circuitry 209 by the filter circuitry 207. Upon receiving configuration from the selected DeNB 105, the UER 101 is further arranged to subsequently select a preferred DeNB 105 from the candidate list based on the received configuration information. The UER 101 may then form a connection to the preferred DeNB 105 via a second communication link 104.

Figure 7:
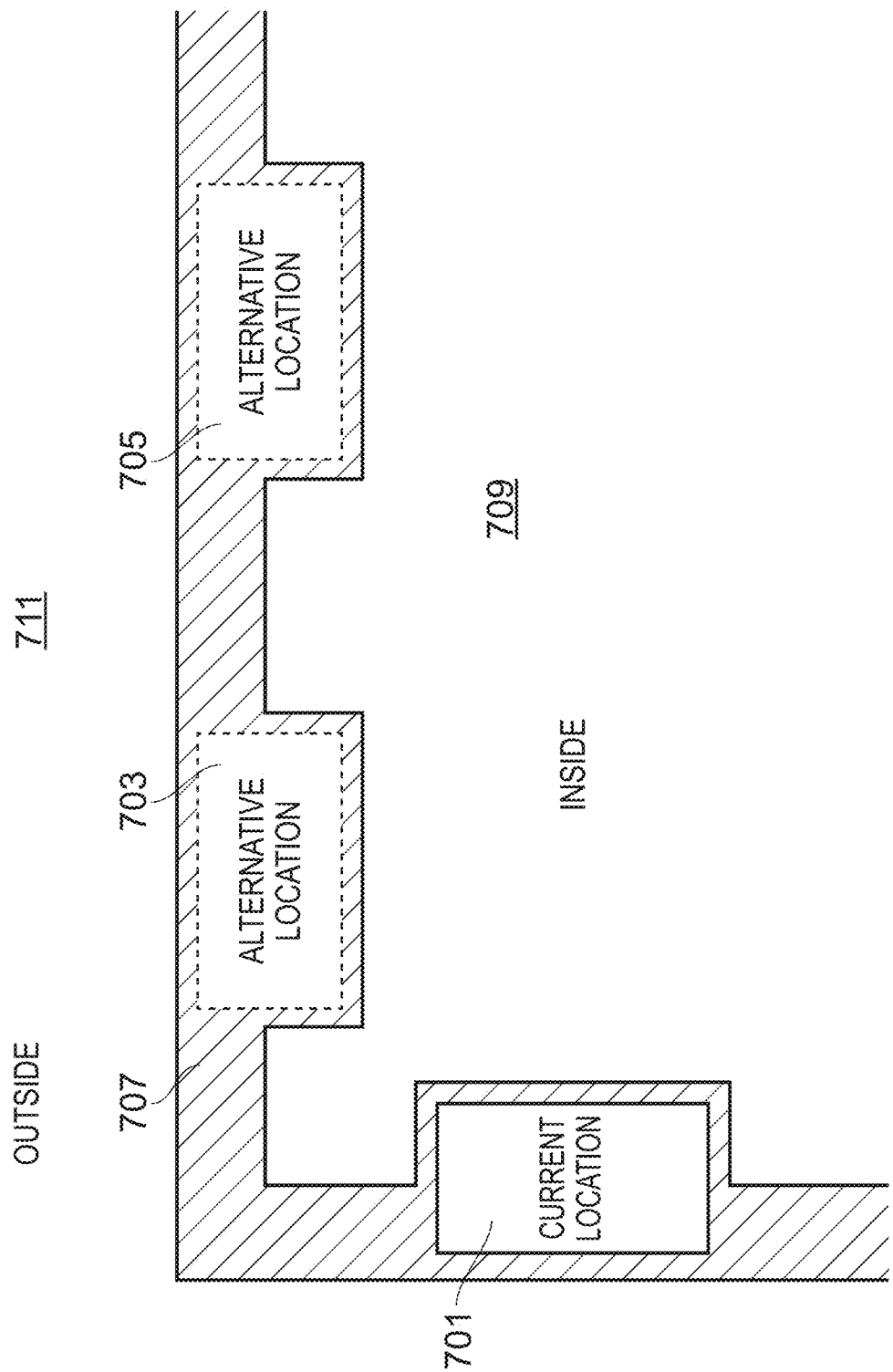
FIG. 7 illustrates how in accordance with some examples an antenna position may be varied by moving the node between a plurality of locations.

FIG. 7 illustrates a plurality of positions of the antenna according to one example of the present technique. A wall 707 is illustrated which comprises a plurality of locations, which may be for example a plurality of window ledges, which are possible locations for the node 101 to be positioned. According to the present technique, the scanning circuitry is configured to perform a scanning operation for each of a plurality of antenna positions, which in this case is achieved by physically moving the node between the current location 701 and the alternative locations 703, 705. The scanning operation may be performed for an initial antenna position, for example the current location 701 which may be a location within a room. Alternatively, the positions may be locations corresponding to a plurality of fixed units, such as lampposts, rooftops, mantelpieces or similar fixed units. The scanning operation may be subsequently performed at each of a plurality of alternative locations 703 and 705 as shown in FIG. 7. This provides a plurality of locations from which DeNBs may be detected with a corresponding performance characteristic. The configurability of the wireless network is therefore improved, since the user is able to select a location of the UER based on a set of preferences.

Figure 8C:
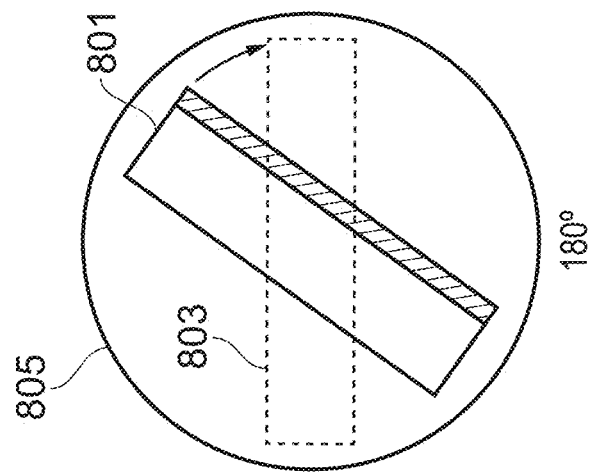
FIGS. 8A, 8B, 8C, 8D, 8E and 8F illustrate how in accordance with some examples an antenna position may be varied by rotation.
Figure 8B:
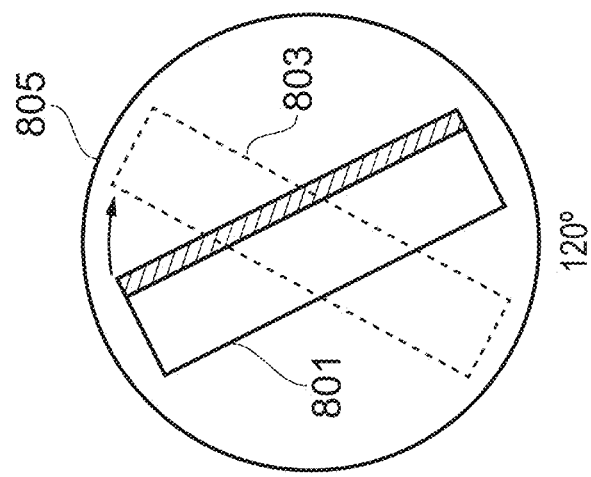
Figure 8A:
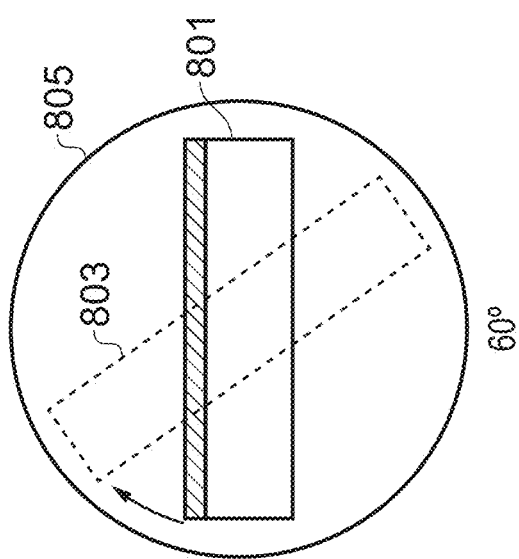
Figure 8F:
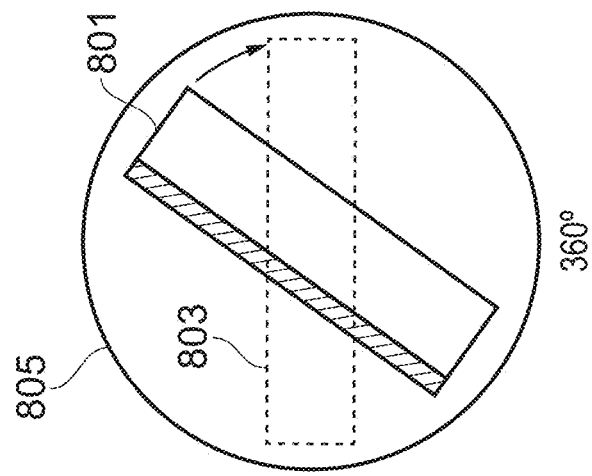
Figure 8E:
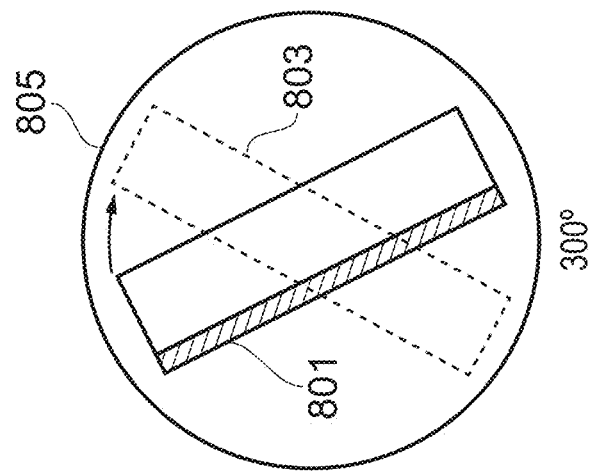
Figure 8D:
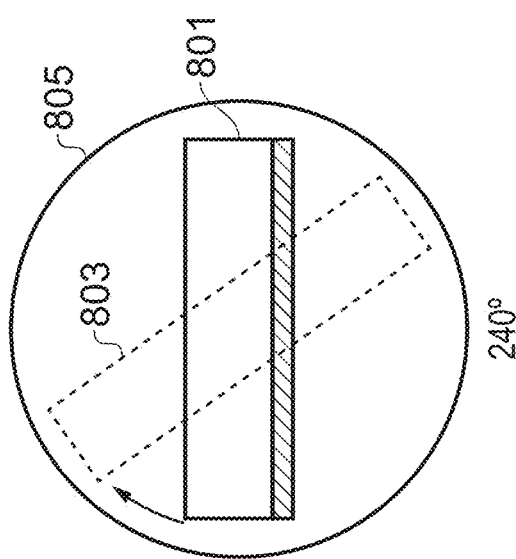

FIGS. 8A to 8E illustrate a plurality of positions of the antenna according to one example of the present technique. As shown in FIG. 8A, a node 805 is comprised of at least an antenna 801. According to the present technique, the scanning circuitry is configured to perform a scanning operation for each of a plurality of antenna positions, which may be, for example, a plurality of antenna rotations represented by a rotation angle. The antenna of FIG. 8A is shown as being rotated from 0 degrees to 60 degrees in one step. The antenna of FIG. 8B is shown as being rotated from 60 degrees to 120 degrees in one step. FIGS. 8C, 8D, 8E and 8F show corresponding rotations of the directional antenna. In this manner, it is possible to rotate the antenna a pre-defined number of degrees between each successive performance of the scanning operation. It will be appreciated that the angle between each rotation is not limited to 60 degrees and may indeed be any interval. In addition, the rotation may be continuous rather than being performed on the basis of a discrete number of fixed rotations. Accordingly, the antenna may be a steerable antenna providing a steering mechanism by which the antenna may be rotated.

Alternatively, an antenna rotation may be an electronic rotation by beamforming (beam steering), removing the need to physically rotate the antenna. By rotating the antenna in each of a plurality of antenna directions, in examples of the present technique it is possible to determine a preferred antenna direction for communication with a candidate donor node, based on the quality of a link to the candidate donor node.

FIG. 9 illustrates a directional antenna 903 of a node 101, which has at least one of a reception beam 901 and a transmission beam 901 that is directional. According to this example, the directional antenna 903 has a non-uniform beam 901 whereby the attenuation of signals received by the directional antenna is non-uniform on for each angle in the azimuth plane. By providing the node of the present technique with a directional antenna 903 it becomes possible to more easily detect the presence of a signal from a desired source, such as a donor node, while simultaneously attenuating a signal from an interference source in a different rotational direction.

Figure 10:
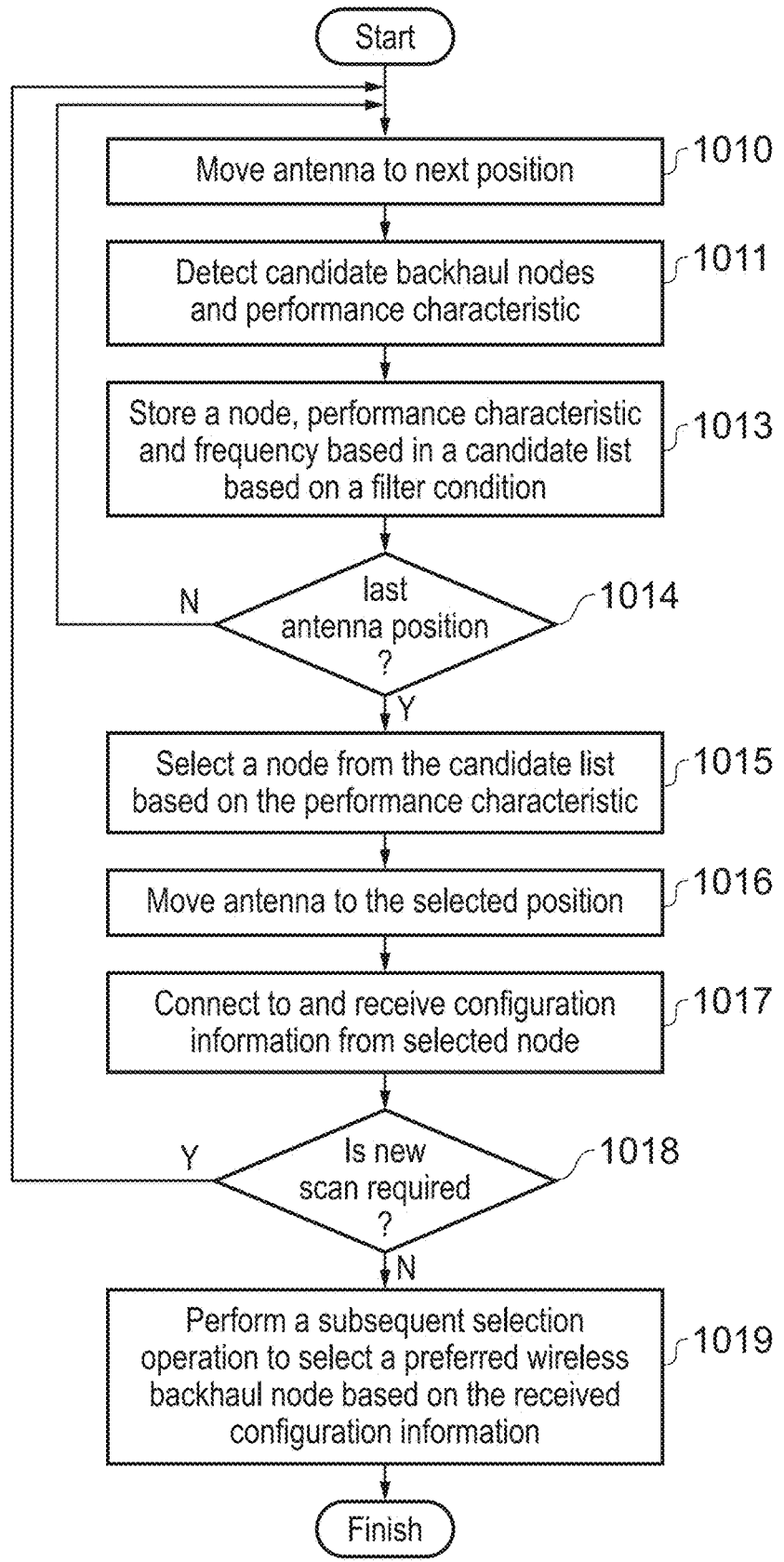
FIG. 10 is a flow diagram which illustrates the steps which may be performed in accordance with some examples of selection of a donor node.

FIG. 10 illustrates, in a flow diagram, a sequence of steps taken by one example of the present technique in order to select a best wireless backhaul node to use as a donor node for a UER in a wireless network. As illustrated in step 1010, the antenna is moved to a next position. At step 1011, a wireless backhaul node is detected and a performance characteristic is detected which corresponds to that wireless backhaul node. This process, which is referred to as the scanning operation, is performed for each of a plurality of antenna positions, as illustrated by step 1014. Next, in step 1013 a node (or a reference to a node, such as the detected DeNB) is stored along with a performance characteristic and the frequency band in a candidate list. This storage operation is performed in dependence on a condition (filter condition) which may be determined according to the LTE 3GPP Standard or another Standard. In some cases, a plurality of nodes may be detected in step 1011. Hence it will be appreciated that a plurality of nodes may be stored in step 1013 in addition to each of their corresponding performance characteristic and frequency band. In step 1014, the UER determines whether step 1011 has been performed for all of the antenna positions. These antenna positions may not be every possible position of the antenna, but may be, for example, each of a plurality of predefined antenna angles to be used during the scanning operation. They may be defined with reference to a predetermined interval, such as every 5 degrees.

A selected wireless backhaul node is selected from among a list of candidate wireless backhaul nodes in the candidate list in step 1015 and the performance characteristic of each wireless backhaul node is used to make the selection. In step 1016, the antenna is moved to the selected position. In step 1017, the UER connects to the selected wireless backhaul node and receives configuration information. This configuration information may be received by connection circuitry 203 and is received from the EMS (Element Management System) via the selected wireless backhaul node. The connection may be performed by forming a communication link with the selected wireless backhaul node prior to the reception of the configuration information. In some examples, an additional scan may be required to be performed as specified in the configuration information as shown in step 1018. For example, if a new band is added or the priority order of the bands is changed. If this is the case, the process repeats at step 1011. Otherwise, the process continues to step 1019.

As illustrated in step 1019, a subsequent selection is performed to select a preferred wireless backhaul node from the candidate list based on the received configuration information. In step 1019, the subsequent selection may be performed by selecting the preferred wireless backhaul node from a modified candidate list since in some examples of the present technique, the configuration information will be used in combination with the candidate list to produce a modified candidate list as described above. The configuration information received from the selected wireless backhaul node enables the user and the operator of the network to have an improved ability to configure the wireless network. In particular, by specifying configuration information, the selected of the preferred wireless backhaul node in step 1019 can be controlled by the operator and therefore improves configurability.

Figure 11:
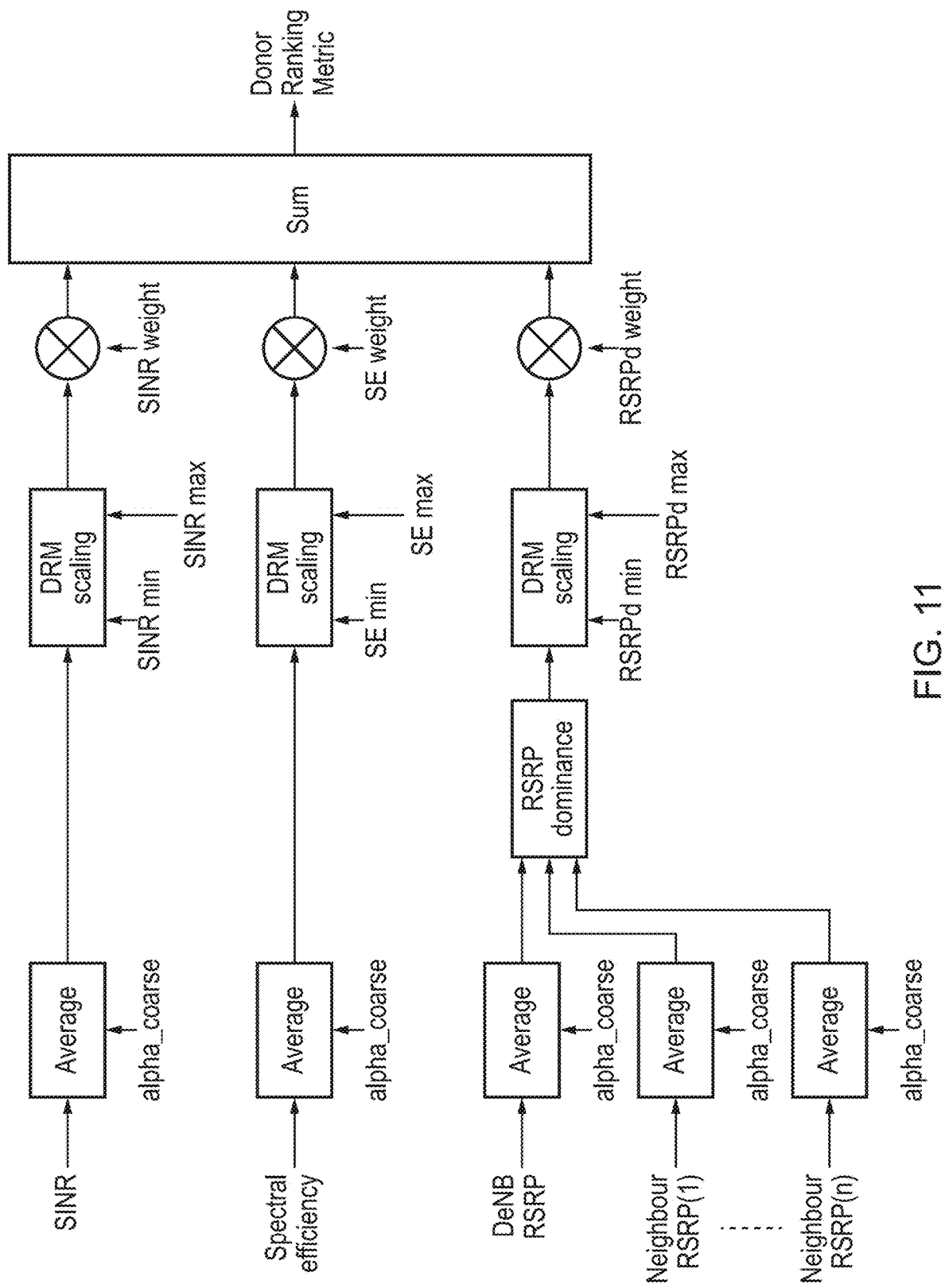
FIG. 11 shows a data flow in respect of calculating a donor ranking metric in accordance with some embodiments.

FIG. 11 shows a data flow in respect of calculating DRM (donor ranking metric). This is made up from three components in this embodiment. The first component first considers RSRP dominance, which is again made up from the RSRP value averaged over a period of time, as well as the RSRP values of neighbours of that node, again averaged over a period of time. The averaging period for coarse alignment (represented by alpha_coarse) is different compared to the averaging period for fine alignment. An example value for alpha_coarse is 0.2421 assuming a 75% settling level, an averaging duration of five seconds and a one second sampling duration. Having calculated the dominance value, this is normalised/scaled based on minimum and maximum values of RSRP dominance and then weighted. Similarly, spectral efficiency and SINR are both averaged over a period of time (represented by alpha_coarse) and normalised/scaled based on minimum and maximum values of spectral efficiency/SINR respectively. These values are then each weighted. The weighted, normalised values of SINR, Spectral Efficiency, and RSRP dominance are then added together to form DRM. Note that in some embodiments, only one of Spectral Efficiency or SINR is considered.

Figure 12:
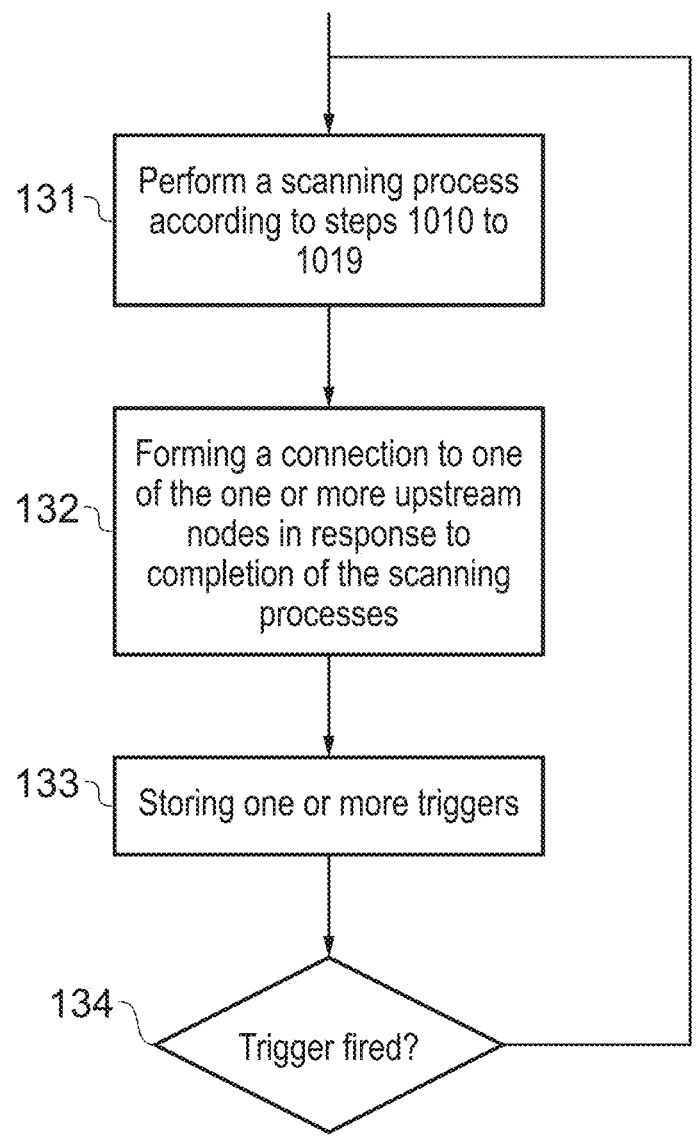
FIG. 12 is a flow diagram which illustrates the steps which may be performed in accordance with some examples of selection of an upstream node.

FIG. 12 illustrates, in a flow diagram, a sequence of steps taken by one example of the present technique in order to form a connection to a wireless backhaul node to be used as a donor node in response to a trigger. As illustrated in step 131, the scanning process as illustrated in FIG. 10 according to steps 1010 to 1019, is performed. Any pre-existing connection to a wireless backhaul node is broken as a result of performing the scanning process. Next, a connection is formed to one of those upstream nodes which are detected by that scanning process, as shown in step 132. According to step 133, one or more triggers are stored in the storage circuitry 209 of the apparatus. In step 134, the scanning circuitry performs the scanning process according to steps 1010 to 1019 in response to a trigger being fired, which returns the flow back to step 131.

Figure 13:
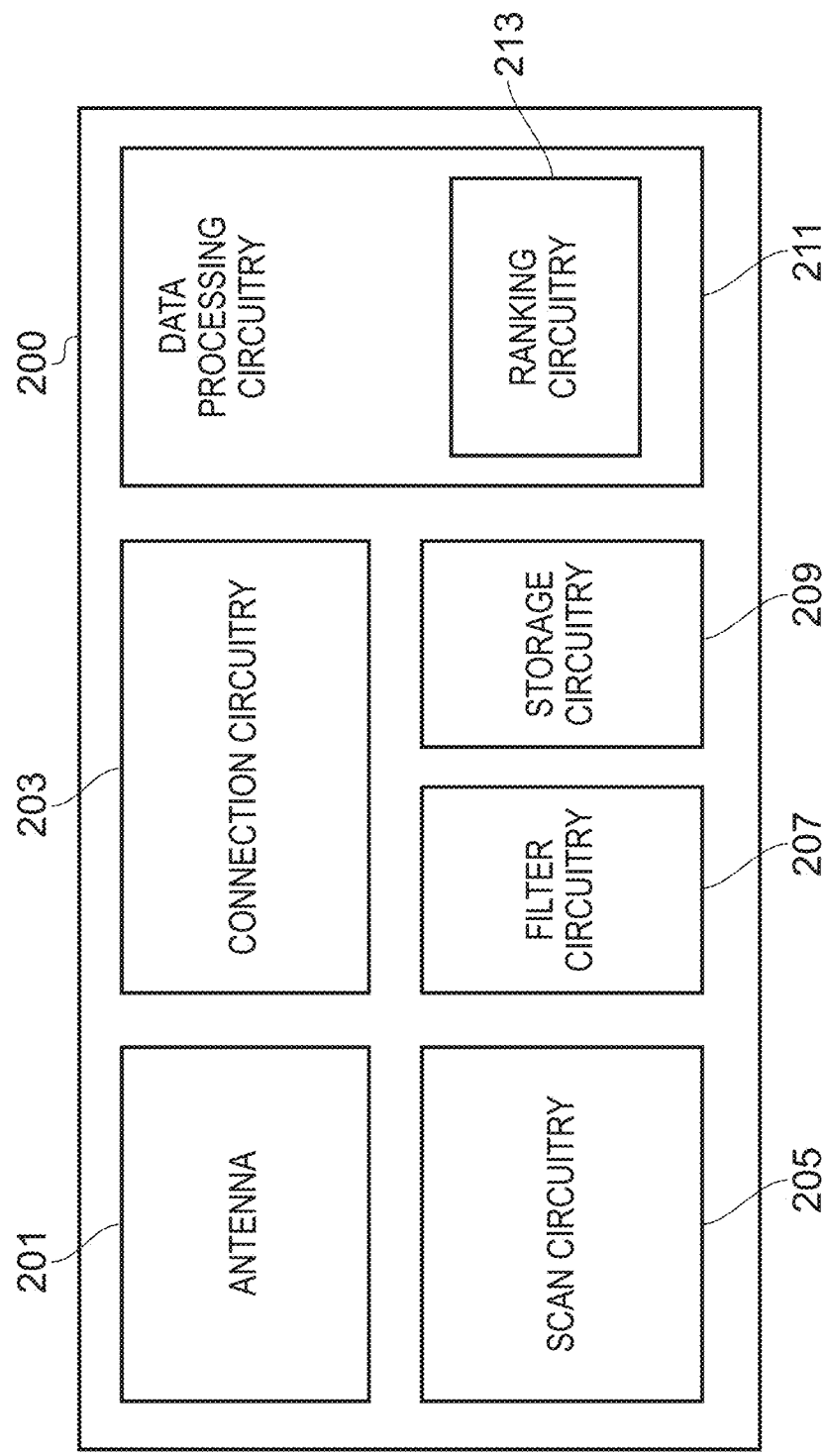
FIG. 13 is a block diagram illustrating the functionality provided within a node 101 of FIG. 1 in accordance with some examples.

FIG. 13 schematically illustrates a node as used in the described examples. As shown, the node 200 comprises scan circuitry 205 which is configured within the node 200 to perform a scanning operation to detect one or more DeNBs 105 and a performance characteristic. The scan circuitry uses the antenna 201 to perform the scanning operation and the antenna 201 is configured to be movable into a plurality of positions to enable the scan circuitry 205 to perform the scanning operation in a plurality of antenna positions. The scanning operation may be performed for all available operator defined bands and detects a performance characteristic associated with each of the one or more DeNBs. In some examples, a "locked" connection may have been established between the node and an upstream node, in which case a trigger (e.g. a condition) is defined to cause the scanning circuitry to perform a scanning process. Filter circuitry 207 is also provided by the node 100 which is arranged within the node 100 to store references to each of the detected DeNB nodes (candidate donor nodes) in a candidate list stored in the storage circuitry 209. The data processing circuitry 211 of the node 100 then selects the best candidate donor node from the candidate list in order to complete the plug-and-play (PnP) functionality of the UER 101. Connection circuitry 203 is comprised within the node 200 to receive configuration information from the candidate donor node selected by the data processing circuitry 211. This configuration information is the configuration information described above, in particular, with reference to FIG. 2.

In addition, there is provided ranking circuitry 213 to rank a plurality of detected upstream nodes based on the set of criteria. The ranking circuitry 213 is arranged to rank one or more upstream nodes based on a set of criteria and the connection circuitry 203 connects to a higher (better) ranked node.

Figure 14:
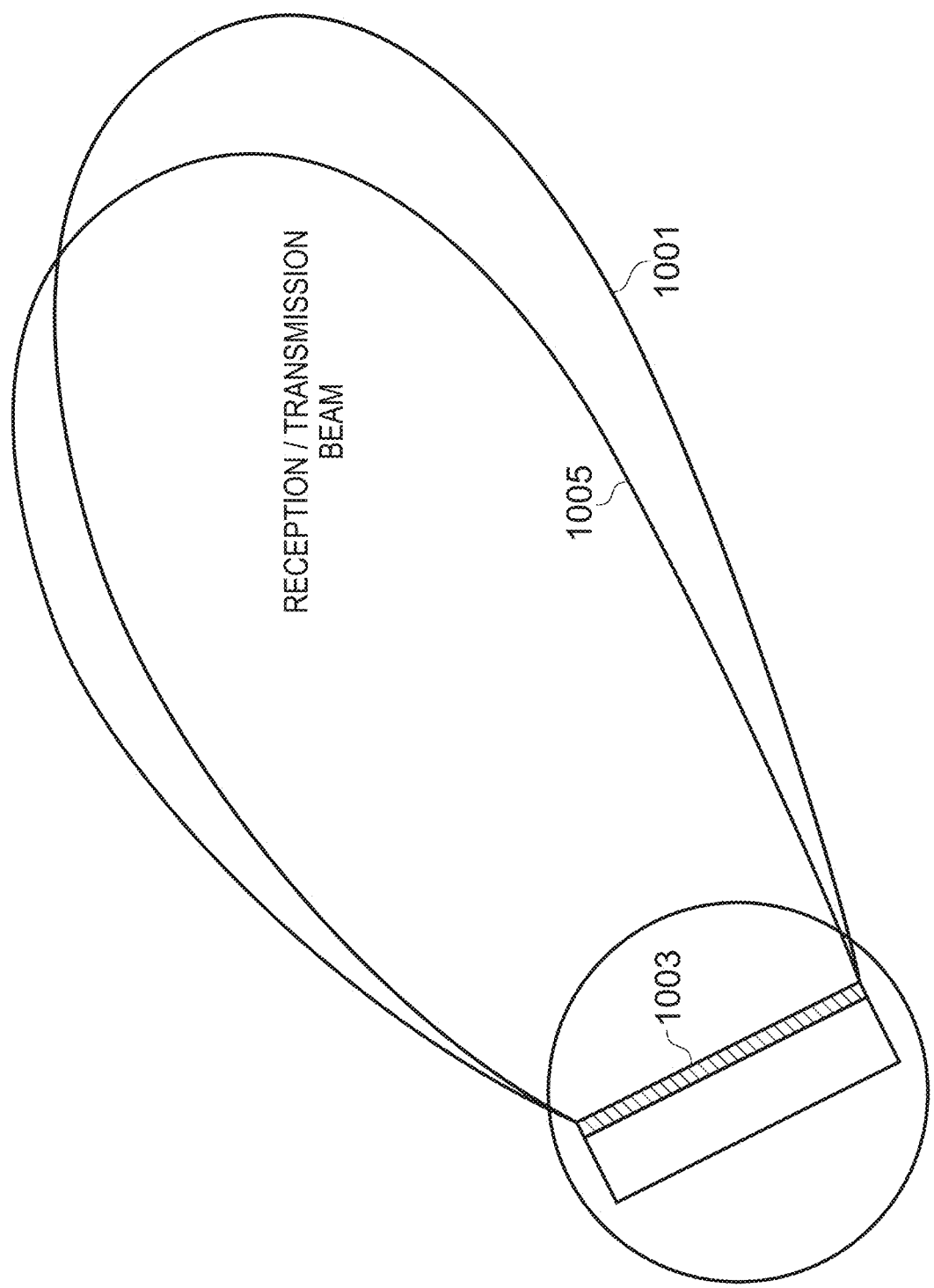
FIG. 14 illustrates how in accordance with some examples an antenna position may be varied electronically using beamforming.

FIG. 14 illustrates a directional antenna 1003 in which the antenna 1003 of a node 101 has a directional reception beam capable of beamforming. As illustrated in FIG. 14, the antenna array 1003 is thereby capable of adjusting the shape of the beam of the antenna array in order to alter the attenuation of signals received from different directions. Thereby, it is possible to alter the attenuation of signals received from different directions and reduce the effects of interference without rotating the antenna array 1003 itself. For example, the beamforming capability of the antenna array 1003 is capable of adjusting the beam from a position 1001 to a position 1005 without rotating the antenna array 1003 itself.

FIG. 15 illustrates an example of the one or more triggers which cause the scanning circuitry to perform the scanning process. In this example, the triggers include: '30 seconds elapse', 'connection breaks', 'cannot connect to a preferred node' and 'cannot connect to highest ranked upstream node'. The node 200 is capable of detecting the occurrence of any one of these triggers. Of course, in the case of the trigger '30 seconds elapse' this could be replaced by any periodic trigger. This could be achieved by the use of a hardware interrupt (for example via a configurable hardware clock, that can cause a piece of software to be executed every period of time) or can be polled (i.e. checked for) every period of time, to determine whether the trigger has occurred or not. In response to the trigger firing (i.e. occurring), the scanning process will be executed, as illustrated with reference to FIG. 10.

FIG. 16 illustrates an example of a ranking of a plurality of upstream nodes detected by the scanning circuitry of a node according to the present technique. As shown in this example, each upstream node may be assigned a unique rank (for example, a rank of '1' may correspond to a highest ranked node). A set of criteria are used to determine the rank of each upstream node. In some examples, the upstream node may be indicated as being a preferred upstream node to be connected to. If an upstream node is a preferred upstream node, it will be assigned the highest rank. In addition, a number of radio frequency properties (such as SINR, RSRP, RSSI) may be used to determine the rank of each upstream node. As shown in this example, the criterion with a highest priority is the preferred flag (indicating a preferred upstream node). This upstream node is assigned with a rank of '1'. The next criterion is SINR which is a radio frequency property. It will be appreciated that in some examples, the set of criteria may include different radio frequency properties, such as those shown in FIGS. 3 and 4, for example Rank Indicator or Spectral Efficiency.

Figure 17:
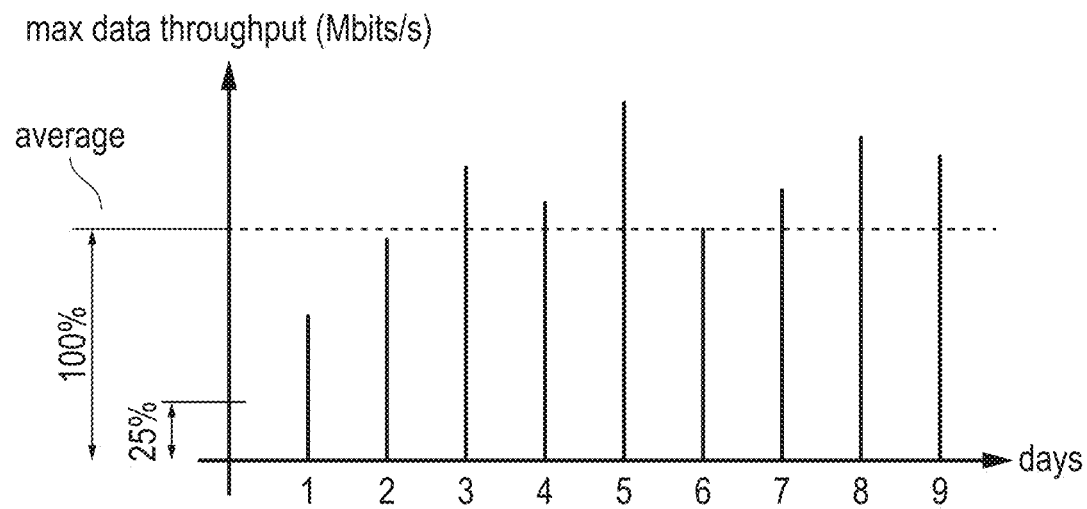
FIG. 17 illustrates a graph of maximum usage per day.

FIG. 17 illustrates a graph of maximum usage (in terms of MBits/s) for each day. The value of the maximum usage differs for each day, as a consequence of the usage of the node varying each day. The average can be calculated as, for example, a mean. The average maximum usage is shown as a line in FIG. 17, with the maximum usage for each day falling above and below the line. In this example, the graph also calculates 25% of the average maximum usage. This calculation is performed because when the usage falls below 25% of the average maximum, the usage might be considered to be low. In view of the fact that the scanning process causes an existing connection to be broken, it may be desirable to perform the scanning process when usage is low (e.g. when the usage falls below 25% of the average maximum). Accordingly, when usage falls below the 25% line, this could represent a suitable time for the scanning process to be performed. Indeed, in some examples, the scanning process could be prohibited from occurring when usage is above this point, since this would represent a situation in which usage was considered to be high. It will be appreciated that the maximum may be a rounded maximum and the average may be a mean, a median, a mode or another type of average. As illustrated. Of course, values other than 25% could be selected as the threshold for indicating a time at which the scanning process can take place. Furthermore, the average could be calculated over a different number of days than that shown (e.g. 9) or could be calculated based on the average maximum usage for the current day of the week, for instance.

Figure 18:
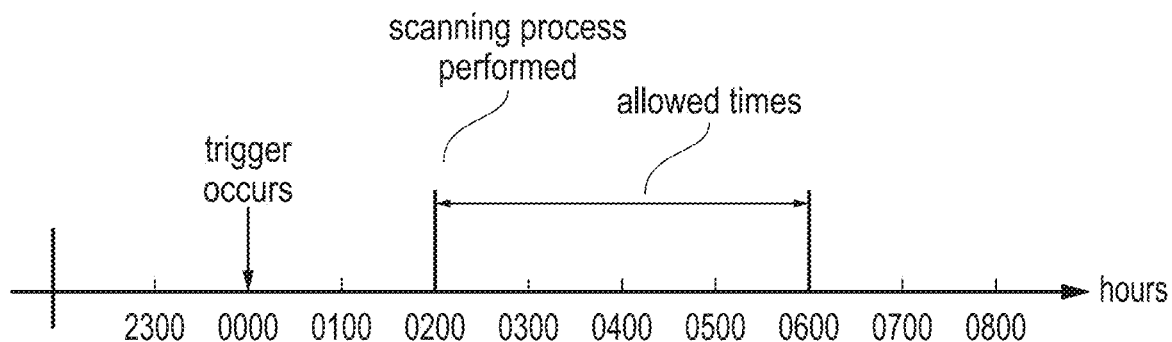
FIG. 18 illustrates a timing window of allowed times within which a scanning process is allowed to take place.

FIG. 18 illustrates a timing window of allowed times within which a scanning process is allowed to take place. In this example, the timing window is between 2:00 am and 6:00 am, however it will be appreciated that the allowed timings may be determined in any number of ways, such as based on the average maximum usage or based on a predefined window user by a user or the operator of the wireless network. In this example, a trigger fires at midnight. However, because this is outside the window during which the scanning process may occur, even though the trigger fires, the scanning process is deferred until 2:00 am when the window for the scanning process opens.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A node configured to operate in a wireless network, comprising:
scanning circuitry to perform a scanning process to detect one or more upstream nodes of said wireless network, wherein an existing connection to an upstream node is broken as a consequence of said scanning process;
connection circuitry to form a connection to at least one of said one or more upstream nodes in response to said scanning circuitry completing said scanning process;
storage circuitry to store one or more triggers; and
processing circuitry to cause said scanning circuitry to perform said scanning process in response to at least one of said one or more triggers, wherein
said scanning circuitry is restricted to performing said scanning process within one or more allowed times; and
said one or more allowed times include at least one of:
a time when usage of said node is at or below 25% of its average maximum usage for a given day, and
a time when usage of said node is at a lowest point.

2. A node according to claim 1, wherein said one or more triggers specify a condition comprising expiration of a timer.

3. A node according to claim 1, wherein
said node comprises ranking circuitry to rank said one or more upstream nodes based on a set of criteria;
said connection circuitry is configured to form a connection to a highest ranked upstream node; and
said one or more triggers specify a condition comprising failing to connect to said highest ranked upstream node.

4. A node according to claim 3, wherein said set of criteria includes radio frequency properties.

5. A node according to claim 3, wherein
said set of criteria includes a preferred upstream node; and
said one or more triggers specify a condition comprising failing to connect to said preferred upstream node.

6. A node according to claim 1, wherein said node is stationary.

7. A node according to claim 1, wherein
said node comprises an antenna array; and
said scanning process causes said antenna array to sweep an area over a period of time.

8. A node according to claim 7, wherein said antenna array sweeps over said area over a period of time by rotation of said antenna array.

9. A node according to claim 7, wherein said antenna array sweeps over said area over a period of time by altering a shape of a beam of said antenna array.

10. A node according to claim 1, wherein said scanning process causes upstream nodes of said wireless network to be discovered by scanning a plurality of frequency bands.

11. A node according to claim 10, wherein
said node comprises an antenna array; and
said scanning process causes said antenna array to sweep an area over a period of time for each band in said plurality of frequency bands.

12. A node according to claim 1, wherein
said one or more upstream nodes provide a wireless backhaul; and
said node acts as a relay node connectable to one or more items of user equipment to which access to said wireless backhaul is provided.

13. A method comprising:
performing a scanning process to detect one or more upstream nodes of a wireless network, wherein any existing connection to an upstream node is broken as a consequence of said scanning process;
forming a connection to at least one of said one or more upstream nodes in response to completion of said scanning process;
storing one or more triggers; and
performing said scanning process in response to at least one of said one or more triggers, wherein
said scanning process is restricted to being performed within one or more allowed times; and
said one or more allowed times include at least one of:
a time when usage of said node is at or below 25% of its average maximum usage for a given day, and
a time when usage of said node is at a lowest point.

14. A node configured to operate in a wireless network, comprising:
means for performing a scanning process to detect one or more upstream nodes of a wireless network, wherein any existing connection to an upstream node is broken as a consequence of said scanning process;
means for forming a connection to at least one of said one or more upstream nodes in response to said means for performing said scanning process completing said scanning process;
means for storing one or more triggers; and
means for causing said means for performing a scanning process to perform said scanning process in response to at least one of said one or more triggers, wherein
said means for performing a scanning process are restricted to performing said scanning process within one or more allowed times; and
said one or more allowed times include at least one of:
a time when usage of said node is at or below 25% of its average maximum usage for a given day, and
a time when usage of said node is at a lowest point.

* * * * *